United States Patent [19]
McCullough et al.

[11] 3,888,419
[45] June 10, 1975

[54] SPIKE NOZZLE FOR ROCKETS

[75] Inventors: Edward E. McCullough; E. Eugene Anderson, both of Brigham City, Utah

[73] Assignee: Thiokol Corporation, Bristol, Pa.

[22] Filed: Sept. 13, 1971

[21] Appl. No.: 179,790

[52] U.S. Cl. .......................................... 239/265.19
[51] Int. Cl. ............................................ B63h 11/10
[58] Field of Search .................. 239/265.11, 265.19

[56] References Cited
UNITED STATES PATENTS

| | | | |
|---|---|---|---|
| 2,857,119 | 10/1958 | Morguloff | 239/265.19 X |
| 2,987,879 | 6/1961 | Brown | 239/265.19 X |
| 3,130,544 | 4/1964 | Penza | 239/265.19 |
| 3,332,243 | 7/1967 | Wilson | 239/265.11 X |
| 3,402,894 | 9/1968 | Wynosky et al. | 239/265.19 X |
| 3,659,789 | 5/1972 | Schultz | 239/265.19 |

*Primary Examiner*—M. Henson Wood, Jr.
*Assistant Examiner*—John J. Love
*Attorney, Agent, or Firm*—Edward E. McCullough

[57] ABSTRACT

A nozzle spike member is supported in a rocket motor and equipped with actuators which may move it axially relative to a fixed convergent-divergent nozzle throat to modulate thrust of the rocket, and may rotate it about a universal joint to change the direction of thrust.

4 Claims, 2 Drawing Figures

PATENTED JUN 10 1975  3,888,419

INVENTORS:
Edward E. McCullough
E. Eugene Anderson

By: Edward E. McCullough
AGENT 3,888,419

SPIKE NOZZLE FOR ROCKETS

BACKGROUND OF THE INVENTION

This invention relates to plug or spike nozzles for rockets. More specifically, it relates to such nozzles having capability of altering both the instantaneous quantity of thrust and the direction thereof. The invention herein described was made in the course of or under a contract with the U.S. Air Force.

Although it has long been recognized that spike nozzles for rockets have certain advantages over the conventional de Laval nozzles, such as greater efficiency over a larger altitude range in the atmosphere, a persistent problem has been development of means for imparting capability to modulate thrust and to change the direction thereof in nozzles of this type.

SUMMARY OF THE INVENTION

The present invention, which is directed toward overcoming this problem of the prior art is essentially a combined convergent-divergent and spike nozzle, wherein the spike member is movable relative to the throat of the convergent-divergent nozzle to effect thrust vector control. A spider support is fixed inside the convergent portion of the convergent-divergent nozzle member spanning the exhaust portion of the rocket. A shield centrally fixed to the spider support protects the spike nozzle member, which is attached to a primary hydraulic actuator by a universal joint. This hydraulic actuator in turn is centrally fixed to the spider support so that it may move the spike member axially relative to the throat portion of the convergent-divergent nozzle. Hence, the annular throat may be enlarged or decreased in size. By this means, the thrust of the rocket, within limits, can be increased or decreased, or the pressure within the rocket can be suddenly increased or decreased for propellant extinguishment. Laterally spaced, secondary hydraulic actuators may rotate the spike member about its universal-joint connection to the primary hydraulic cylinder to change direction of the thrust vector. Sealing means are provided to insure that hot gases from the propellant combustion cannot enter between the spike nozzle member and its protective shield, wherein the hydraulic actuators are housed.

Objects of the invention are to provide a spike nozzle for rockets that is simple in construction, yet capable of controlling the thrust vector of the rocket, both in direction and in magnitude. An important feature of the invention is that, because of the relatively small loads that would be imposed on the spike nozzle member in the operating rocket, the sizes of the actuators can be minimized.

Other objects and advantages of the invention will become apparent as the following detailed description is read with reference to the accompanying drawings, wherein the same parts are designated by the same numbers throughout the disclosure.

DESCRIPTION OF THE PREFERRED EMBODIMENTS

Figure 1:
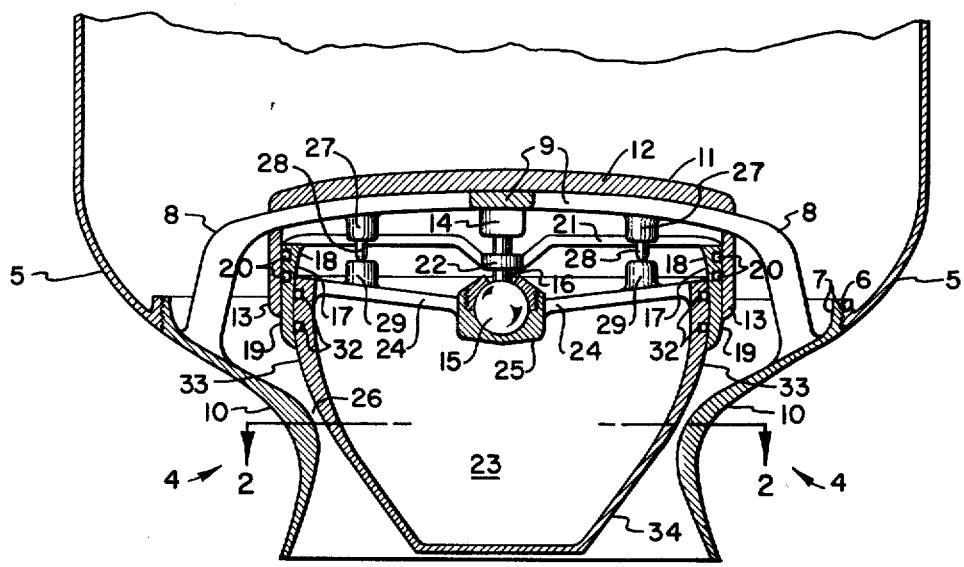
FIG. 1 is a longitudinal section of the invention.
Figure 2:
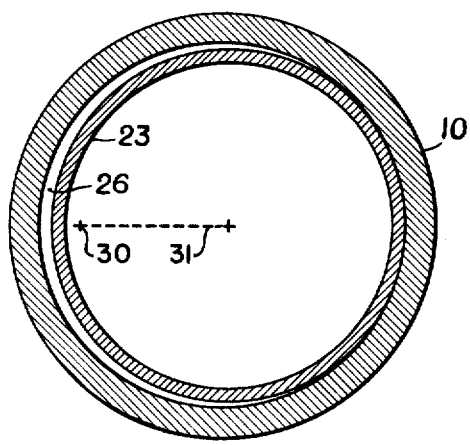
FIG. 2 is a cross section taken on Line 2-2 of FIG. 1, but showing the spike nozzle member rotated into an extreme lateral position, rather than the neutral position shown in FIG. 1.

As illustrated in FIG. 1, the thrust nozzle 4 of the invention is attachable to a rocket motor case 5 by some conventional means, such as the screw threads 6 on mating flanges 7. A spider support 8, having a plurality of arms 9, is centrally fixed into the convergent portion of a convergent-divergent nozzle member 10. An insulating shield 11, having a substantially disk-like portion 12 and a peripheral, annular, aftwardly extending flange 13, is attached to the spider support 8 so that the disk portion 12 is on the upstream side of the spider support 8 and the arms 9 of the support 8 project, in sealed relationship, through the flange 13 of the shield 11. A primary, double-acting hydraulic actuator 14, is centrally fixed to the spider support 8, so that it extends aftwardly. A ball 15, or other universal joint, is attached to the end of the actuation arm 16 of the actuator 14. A sleeve 17 has an inner, spherical surface 18 concentric about the pivotal center of the universal joint 15 and an outer surface 19 that is cylindrical, and fits inside the cylindrical flange 13 of the shield 11 with close tolerance for sliding movement therein. Annular, rubber seals 20, seated in annular grooves in the outer surface 19 of the sleeve 17, provide gas-tight seals between the sleeve 17 and the insulating shield 11. Various other well-known sealing means may be used, depending on the heat and pressure generated in the specific type of rocket, such as annular flexible bearings made of alternate laminae of steel and rubber stacked and bonded together. Radial arms 21 extend from the forward end of the sleeve 17 inwardly to join a collar 22 that is fixed to the actuation arm 16, so that the sleeve 17 is moved axially with the arm 16. A spike nozzle member 23 also has radial arms 24 attached to its forward end. These arms 24 are fixed to a central socket joint 25 that fits on the ball 15 to form a universal joint therewith. The annular throat 26, formed between the spike member 23 and the convergent-divergent nozzle member 10, may be enlarged or decreased in size by the hydraulic actuator 14. A plurality of secondary hydraulic actuators 27 are equally spaced radially from the axis of the rocket and are fixed to the arms 9 of the spider support 8 so that their actuation arms 27 engage bearing members 29 on the radial arms 24 of the spike nozzle member 23. These actuators 27 may be used to rotate the spike member 23 about the universal joint 15. As may be seen in FIG. 2, such rotation has the effect of closing one side of the annular throat 26 to useful thrust so that the thrust vector 30 of the rocket is moved very close to the open side of the throat 26. This creates a moment arm 31 (represented by a broken line) that may act about the center of mass of the rocket for changing the direction thereof. In practice, rotation of the spike member 23 also shifts the thrust vector 30 angularly relative to the axis of the rocket, so that the moment arm 31 actually becomes much larger than shown in FIG. 2, for more effective steering.

A second set 32 of annular, rubber seals are seated in annular grooves in the forward, outer surface of the spike member 23, to effect a gas-tight seal between this surface and the inner surface 18 of the sleeve 17.

The external surface of the spike member is formed by two annular surfaces that are faired into one another as a continuous surface. The forward portion of this surface is a partial spherical surface 33, concentric about the pivot point of the universal joint 15, that fits that 18 of the sleeve 17. The aft portion 34 of this surface is substantially a truncated cone, shaped for optimum expansion of the propulsive gases of the rocket. The juncture of these two surfaces 33 and 34 lies approximately at the smallest diameter of the inside surface of the convergent-divergent nozzle member 10. Hence, when the spike member 23 is rotated by the secondary actuators 27, one side of the throat 26 is closed to effective thrust to the extent to which the spike member 23 is rotated.

Parts exposed to the heat of the rocket motor combustion chamber, e.g., the shield 11, spider support 8, and sleeve 17, may be made of any of the conventional materials for parts so exposed. Such materials are commonly steel structural members heavily insulated with carbonaceous materials or materials that may become carbonaceous when exposed to high temperatures, such as graphite or any of various thermosetting resins filled with refractory materials. Phenolic or epoxy resins filled with asbestos particles or carbon cloth are examples of such materials. The spike member 23 is similarly constructed.

An invention has been described that advances the art of thrust nozzle for rockets. Although the embodiment described has been quite specific with regard to detail, such details may be altered somewhat without departing from the invention as defined in the following claims.

The invention claimed is:
1. A thrust nozzle for rockets comprising:
a convergent-divergent nozzle member having attachment means for attaching it to a rocket:
a spider support fixed to the convergent portion of the convergent-divergent nozzle member;
an insulating shield substantially in the form of a disk with a peripheral, annular flange extending aftwardly at right angles thereto, the shield being centrally fixed to the forward side of the spider support, the arms of which extend in sealed relationship, through the aftwardly-extending flange;
a primary, fluid-operated actuator, having an actuation arm, centrally fixed to the spider support and extending aftwardly;
a univrsal joint fixed to the actuation arm;
a spike nozzle member fastened on the universal joint and extending aftwardly in the throat portion of the convergent-divergent nozzle member, whereby it may form an annular throat therewith that may be varied in size as the spike nozzle member is moved axially relative to the convergent-divergent nozzle member by the first actuator;
a secondary fluid-operated actuator fixed to an arm of the spider support, spaced from the center therof, extending aftwardly, and having an actuation arm in contact with the spike nozzle member, whereby it may rotate the spike nozzle member about the universal joint; and
sealing means between the spike nozzle member and the flange of the insulating shield to prevent hot, propulsive gases of the rocket from entering therein.

2. The thrust nozzle of claim 1 wherein the spike nozzle has an external surface formed by a spike expansion surface, on which propulsive gases of the rocket may expand, that is continuous with a partial spherical surface concentric about the pivotal center of the universal joint, the intersection of the two surfaces being located substantially at the throat of the convergent divergent nozzle memeber, member, that one side of the annular throat may be closed when the spike nozzle member is rotated about the universal joint.

3. The thrust nozzle of claim 1 wherein the universal joint is a ball and socket joint.

4. The thrust nozzle claim 2 wherein the sealing means between the spike nozzle member and the insulating shield comprises:
a sleeve that fits inside the flange of the insulating shield for sliding relationship therewith and has an inside surface closely surrounding the spherical surface of the spike nozzle member, this slide member being operatively attached to the actuation arm of the primary actuator so that it may be moved axially therewith;
annular seals seated in grooves in the outer surface of the slide member to form a sealed relationship with the flange of the insulating shield; and
annular seals seated in grooves in the partial spherical surface of the spike nozzle member to form a sealed relationship with the sleeve.

* * * * *